United States Patent [19]

Hoshen et al.

[11] Patent Number: 5,274,807
[45] Date of Patent: Dec. 28, 1993

[54] METHOD FOR REDUCING MAGNETIC STORAGE VOLUME FOR COMPUTER DISK IMAGE BACKUP

[75] Inventors: Joseph Hoshen, Naperville; Brian L. Katzung, Aurora; Omar H. Salvador, Winfield, all of Ill.

[73] Assignee: AT&T Bell Laboratories, Murray Hill, N.J.

[21] Appl. No.: 607,922

[22] Filed: Nov. 1, 1990

[51] Int. Cl.⁵ .............................................. G06F 12/06
[52] U.S. Cl. .......................... 395/650; 364/DIG. 2; 364/964.6; 364/957.1
[58] Field of Search ................. 364/DIG. 2; 395/650, 395/425

[56] References Cited

U.S. PATENT DOCUMENTS 4,686,620  8/1987  Ng ....................................... 364/200
4,956,808  9/1990  Aakre et al. ................... 364/DIG. 2
5,109,485  4/1992  Smith, Jr. ...................... 364/DIG. 1

Primary Examiner—Thomas M. Heckler
Attorney, Agent, or Firm—Michael B. Johannesen

[57] ABSTRACT

A computer data backup method where copying of data blocks from one medium to another is deferred until a data structure, e.g. a bit map, is generated defining those data blocks that in fact contain data. The data structure is then read to copy to the backup medium the data-containing blocks as defined by the data structure. Since the data structure is generated before the copying is effected, a range of contiguous data-containing blocks is determinable such that all the blocks of that contiguous range may be copied as a single continuous operation. The magnitude of required backup storage is reduced by eliminating the copying of empty blocks in general unless the number of empty blocks between two ranges of contiguous data-containing blocks is less than a predefined number.

19 Claims, 13 Drawing Sheets

DISK MEMORY

METHOD FOR REDUCING MAGNETIC STORAGE VOLUME FOR COMPUTER DISK IMAGE BACKUP

TECHNICAL FIELD

This invention relates to computer systems in general, and more specifically, to a method for copying computer data from a first medium to a second medium.

BACKGROUND OF THE INVENTION

A computer system generally maintains a copy of the operational program information ("generic") and operational data information ("data base") on a first medium, which is usually a disk system. Periodically, the information on the disk is copied to a second medium, usually magnetic tape, for the purpose of updating the system or archiving the information on the disk. In stored program controlled switching systems, for example, the generic information and the data base information are copied from the switching system's disk to a magnetic tape, sent to a central location where they are de-compiled, updated, re-compiled and sent back to the switching system. Also, most systems keep an archive tape copy of the disk information so that, if the disk information is damaged because of hardware or software errors or a computer "virus", for example, the computer disk system may be restored to a known state from the tape copy.

Over the past several years, disk information storage capacity has increased dramatically. With known computer data backup arrangements, the time required to copy disk information onto tape and the magnitude of required tape storage become increasingly serious problems with increased capacity disk storage.

SUMMARY OF THE INVENTION

These problems are solved and a technical advance is achieved in accordance with the principles of the invention in an exemplary computer data backup method where any copying of data blocks from one medium to another—for example, from computer disk to magnetic tape—is advantageously deferred until a data structure, e.g. a bit map, is generated defining those data blocks that in fact contain data. The data structure is then read to copy to the backup medium only the data-containing blocks as defined by the data structure. Since the data structure is generated before the copying is effected, a range of contiguous data-containing blocks is determinable such that all the blocks of that contiguous range may be copied as a single continuous operation. The magnitude of required backup storage is reduced by eliminating the copying of empty blocks in general unless the number of empty blocks between two ranges of contiguous data-containing blocks is less than a predefined number. The predefined number corresponds to the size in blocks of media overhead that is occurs any time a copy operation is performed. In accordance with the exemplary data backup method herein, empty blocks are included as part of a single, continuous copy operation with preceding and succeeding ranges of contiguous data-containing blocks only when their elimination would waste both time in the copying operation and storage space on the tape because storing the empty blocks requires less time and storage space than the media overhead.

A method in accordance with the invention is used to copy information stored on a first medium to a second medium, where the information is stored on the first medium as a plurality of blocks. The stored blocks that contain data are determined and a data structure is generated defining those blocks. The data structure is then read and the data-containing blocks defined by the read data structure are copied to the second medium.

In the exemplary backup method a bit map representing data blocks containing data is generated by traversing the disk file organizational structure. For each data block that is allocated to a file, a bit corresponding to the disk address of the data block is set in the bit map. The bit map is then read to determine a first and a second contiguous range of allocated data blocks to be copied. A determination is made whether the number of contiguous unallocated data blocks between the first and second contiguous ranges is less than a predetermined number corresponding to the media overhead. If the number of contiguous unallocated data blocks is less than the predetermined number, then the first contiguous range, the unallocated data blocks and the second range of contiguous allocated data blocks are concatenated as the first range and the above steps are repeated. When the number of contiguous, non-allocated data blocks is not less than the predetermined number, then a header block is formatted, including the address of the first data block in the first range, and the header block and the first range are copied to tape. When the disk is restored from tape, the header block is read and the data blocks are copied from tape to disk, starting at the address recorded in the header.

To elaborate, the exemplary method is used to copy information from a computer disk to a magnetic tape. The information is stored as a plurality of files, where the files are organized into one or more file systems. Each of the file systems includes a list of file descriptors. The file descriptors include a list of the data blocks that store the information on the computer disk. The file systems to be copied to tape are determined and, for each determined file system, a bit map is generated by traversing the file descriptor list for that file system. A bit in the generated bit map is set to a given binary value for each data block in the file descriptor. Processing then proceeds as above.

In an alternative method of the invention, a bit map is made of data blocks allocated to files, as above. After the bit map is made, a copy of the bit map is copied to tape. Contiguous ranges of allocated data blocks are then determined and copied to tape. When the tape is copied back to disk, the bit map is first copied into main memory. Next, the data blocks stored on tape are copied to disk, at locations corresponding to the set bits in the bit map.

DETAILED DESCRIPTION

Figure 1:
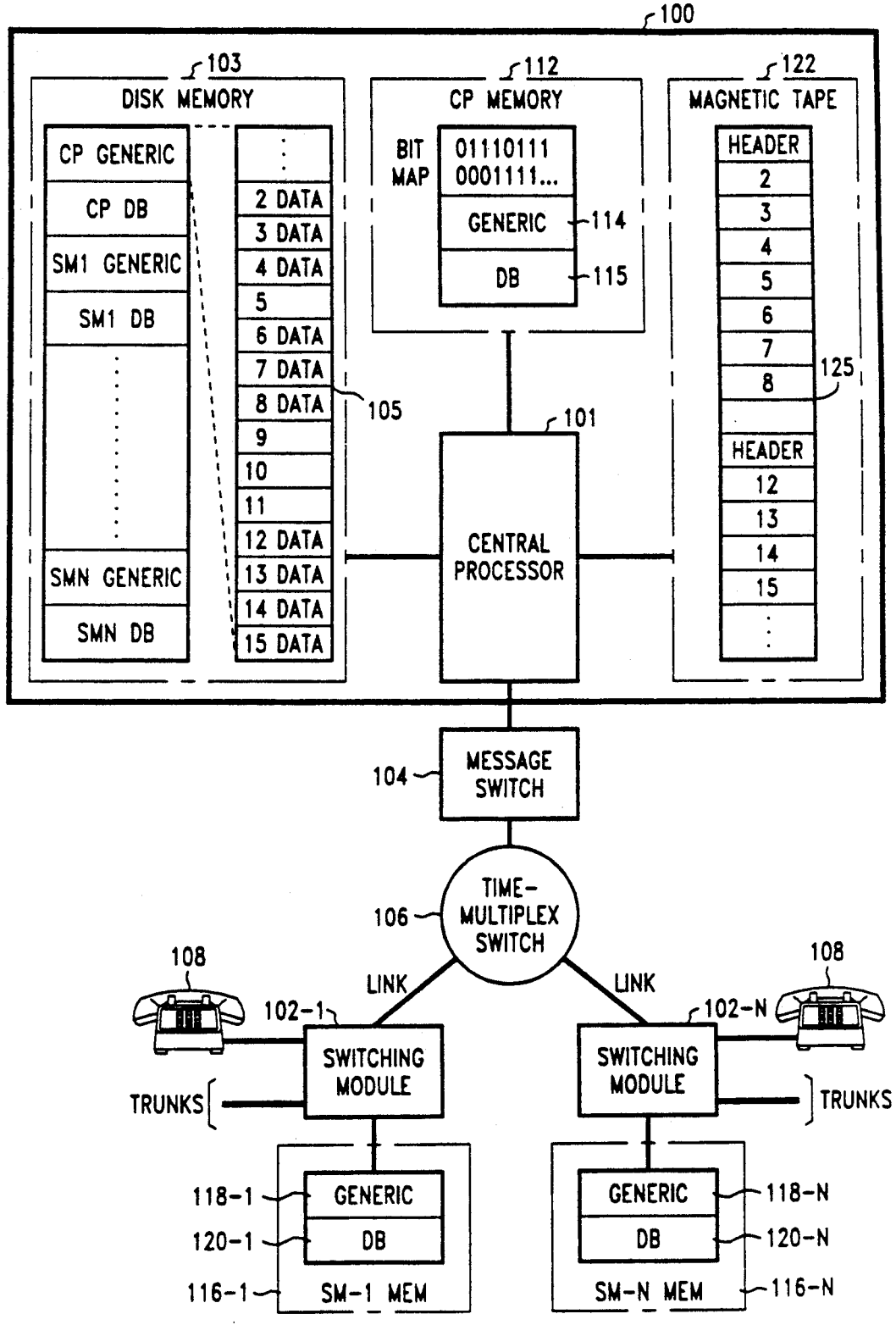
FIG. 1 is a block diagram of a distributed telephone switching system with a heavy-line block around the portions of the system where an exemplary computer data backup method of the invention is performed.

FIG. 1 shows a simplified block diagram of a distributed telephone switching system such as a 5ESS® switching system as manufactured by AT&T. This system is described in the November, 1981 Bell Laboratories Record, beginning at page 258 and in the December, 1981 Bell Laboratories Record, beginning at page 290. This system is used to illustrate the principles of this invention.

Fundamentally, the system comprises a central processor 101 and one or more switching modules 102-1-102-N. In the illustrative system, central processor 101 is a commercially available 3B-20D processor, also manufactured by AT&T. Central processor 101 handles functions that require centralized intelligence, including allocation of resources and overall maintenance, and is interfaced with operation support systems for record keeping, trouble shooting, etc.

Continuing with FIG. 1, central processor 101 is connected to switch modules 102-1-102-N via a message switch 104 and a time-multiplexed switch 106. Message switch 104 directs the routing of control messages between central processor 101 and the switch modules, and between the switch modules themselves. These messages travel through the time-multiplexed switch 106.

Microprocessor controlled switch modules 102 provide most call processing functions. Switch modules 102 provide the interfaces between the system and telephone stations 108 and trunks 110. Connections involving more than a single switch module are provided by the time-multiplex switch 106. Further description of the architecture of the switching system of FIG. 1 is not important to the present invention and is not included herein.

Central processor 101 maintains a copy of generic 114 and data base 115 in disk memory 103, and also maintains a copy of the switch modules' generics 118-1-118-N and data bases 120-1-120-N in disk memory 103. During system initialization, the disk copy of the generics and data bases are read into memory of the various processors and modules. Because of the critical nature of the disk information, it is necessary that a backup tape copy is maintained to restore the disk in case of hardware or software errors causing information on the disk to be lost or damaged. Furthermore, when the generic and the data base are updated, a tape copy of the disk is made and sent to a central location where it is updated. Therefore, a method is necessary to quickly and efficiently copy disk information to tape.

Heavy line block 100 defines the area of operation of a preferred embodiment of a method of copying information from one medium to a second medium according to this invention. As stated above, a copy of the generic and data base from the CP and the SM's is stored on disk memory 103. Each generic and data base is stored on disk memory 103 as sequentially addressed data blocks, as illustrated at 105. The numerals 2-15 represent data block addresses, and data blocks marked "DATA" indicate blocks that contain information. The unmarked data blocks are empty. One or more data blocks comprise a file, and one or more files comprise a file system. There may be more than one file system per disk memory 103.

Prior art copying methods copy all data blocks 2-15 regardless of whether the blocks contain data. According to this embodiment of this invention, only those blocks that contain data (i.e. 2-4, 6-8, 12-15) are copied to tape. A header block is prepended to each group of data blocks that is copied, and the tape stops after each block, resulting in media overhead, in this instance, two inter-record gaps for tape acceleration to read/write speed and a header block. In the case of data block 5, the media overhead wastes more space than copying the empty data block to tape does. This invention provides a method for solving the above problem.

According to an exemplary method of this invention, a bit map 115 is created in CP memory 112, a bit is set in bit map 113 for each data-containing data block in memory 103. For example, reading from the left, bits 2-4, 6-8 and 12-15 are set in bit map 113. The bit map is then read, and a first and second range of contiguous, non-empty data blocks are determined. In this example, data blocks 2-4 are the first range, and data blocks 6-8 are the second range. The number of data blocks between the first and second ranges is then determined, which in this example is one (data block 5). If a number representing the empty data blocks between the first range and the second range is less than the tape required for the media overhead that would be inserted between these two ranges if they were copied separately, then the first range, the empty data blocks and the second range are concatenated as the first range, and a new second range is determined. In this example, the tape required to write the empty data blocks (1) is less than the tape required for the media overhead, and data blocks 2-8 become the first range. These steps are repeated until the tape required to write empty data blocks between the first and second ranges is greater than or equal to the media overhead. In this example, a new second range is determined to be data blocks 12-15. The length of tape required to write data blocks between the first range and the second range (3) is, for purposes of this illustration, greater than the media overhead. A header block is created recording the disk address of the first data block in the first range and the number of data blocks in the first range. The first range is then copied to tape, and the second range becomes the first range. These steps repeat until all data blocks containing data have been copied.

The result is shown in 125, where a section of the tape is illustrated. Tape section 125 includes a header file followed by data blocks 2-8. Data block 5 was copied even though it was empty, because it was the only empty data block between two contiguous ranges and the tape required to store the block was shorter than tape required for the media overhead. A new header and range were copied to tape for data blocks 12-15, because the space required to store empty data blocks 9-11 on tape, for example, is larger than the tape space of the media overhead.

Figure 2:
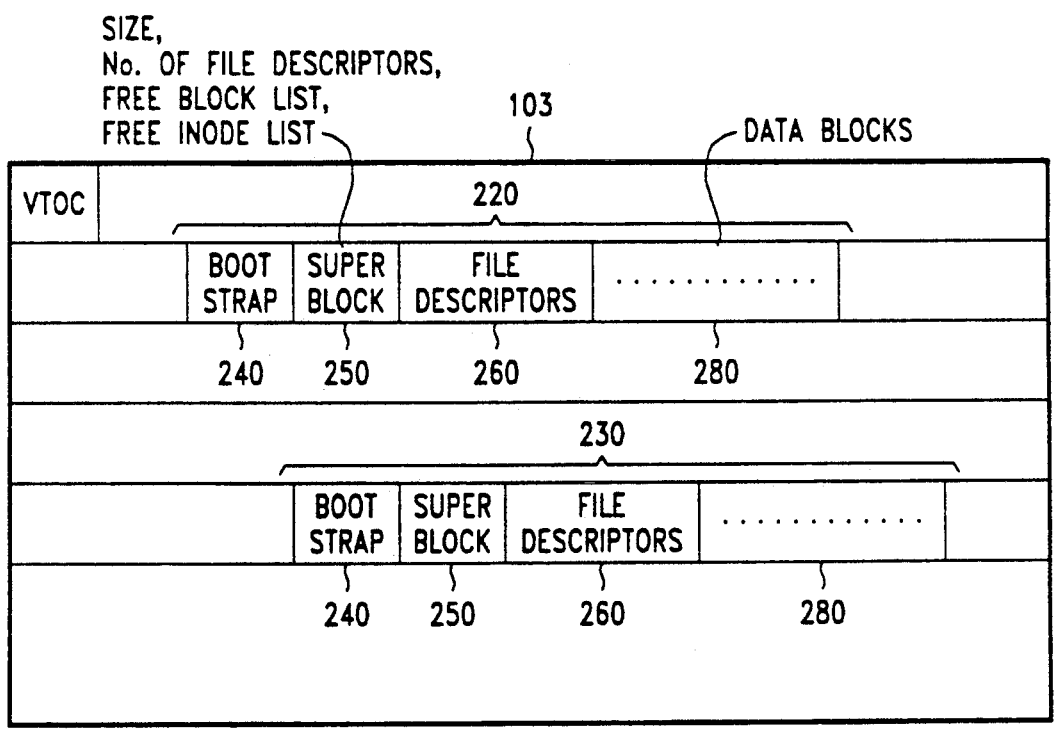
FIG. 2 is a block diagram representative of the data block layout of a disk memory included in the switching system of FIG. 1.

In order to build the bit map, the organizational structure of the disk memory 103 is traversed, and a bit is marked in the bit map for each data block that is allocated to a file. For purposes of this embodiment of this invention, a data block contains data if it is allocated to a file. Turning now to FIG. 2, the high level layout of the disk 103 is shown. First, the volume table of contents 210 (VTOC) of the disk is read. VTOC 210 lists and describes the file systems on disk 103, including the disk address of the first data block of the file system, the number of data blocks in the file system, and whether the file system contains generic or database data.

In this example, there are two file systems 220, 230 on disk 103. The file systems are then read, and a bit is set in bit map 116 (FIG. 1) for any organizational blocks. The first one or more data blocks comprise bootstrap 240 information, as known in the art. Each file system next includes a super block 250, or organization block. Super block 250 includes information regarding file system including size, an offset to the disk address of the first data block, a pointer to a list of free data blocks, etc. Following super block 250 is an array of file descriptors. A file descriptor 260 is a data structure which lists the data blocks belonging to a file. Following the file descriptor table is an array of data blocks.

Figure 3:
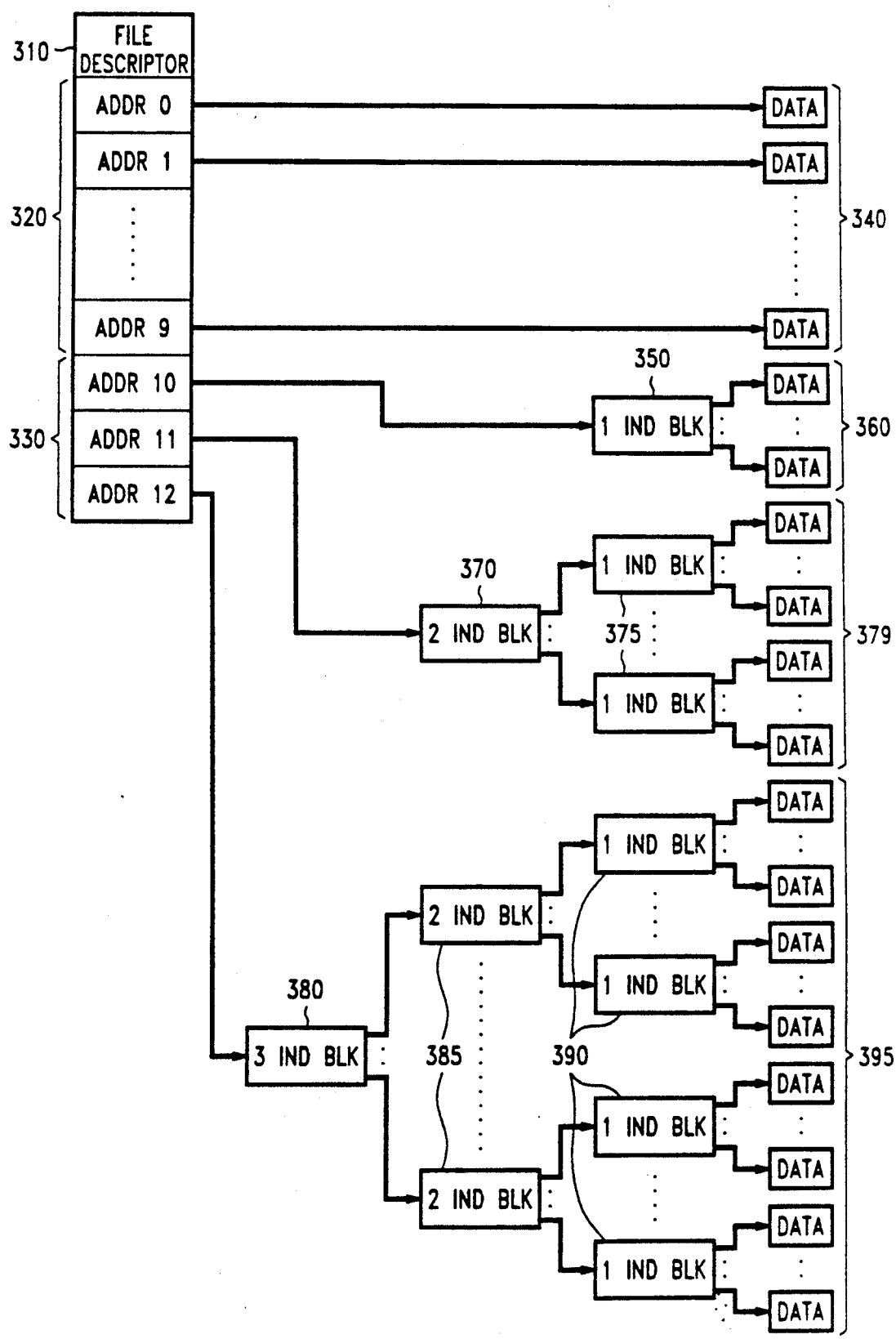
FIGS. 3–5 are block diagrams of typical file descriptors for organizing the data blocks of the disk memory included in the switching system of FIG. 1.

In the file organizational structure of the preferred embodiment of this invention, files may have contiguous data blocks, random data blocks, or a combination of the two. To this end, three types of file descriptors are taken into account when the bit map is made. Turning now to FIG. 3, a regular or random data block file descriptor is illustrated. For each file descriptor 310 of this type there is an array of direct data block addresses ADDR 0-9, labeled 320. In this embodiment, the file descriptor contains, for example, ten entries ADDR 0-9 which directly list data block addresses 340. The last three entries ADDR 10-12, labeled 330, of file descriptor 310 indirectly list data block addresses. ADDR 10 references a data block 350 which is a singly indirect block. Indirect data block 350 lists the addresses of regular data blocks 360. ADDR 11 references a doubly indirect data block 370, which lists up to 128 singly indirect data blocks 375, each of which contains a list of up to 128 regular data blocks 379. Finally, ADDR 12 points to a triply indirect data block 380, which contains a list of up to 128 doubly indirect data blocks 385, each of which contain lists of up to 128 singly indirect data blocks 390, each of which contain lists of up to 128 regular data blocks 395.

Figure 4:
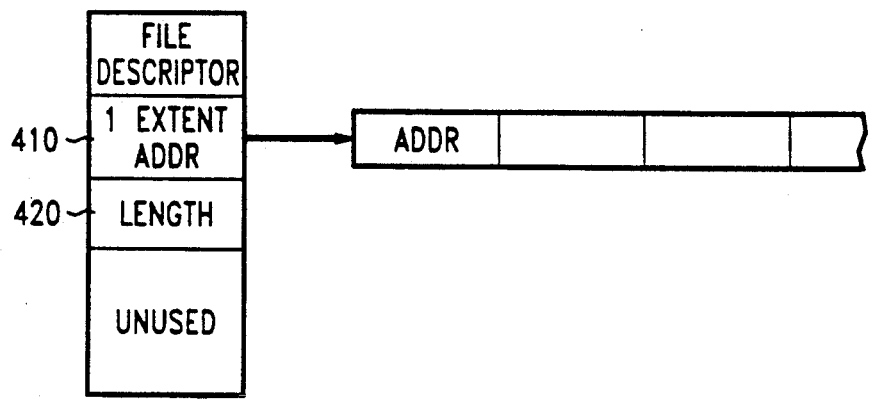

In FIG. 4, a file descriptor that describes a file consisting of contiguous data blocks is shown. The file descriptor includes the address of the first data block 410, and an entry 420 for the length or number of contiguous data blocks. The rest of the file descriptor is not used.

Figure 5:
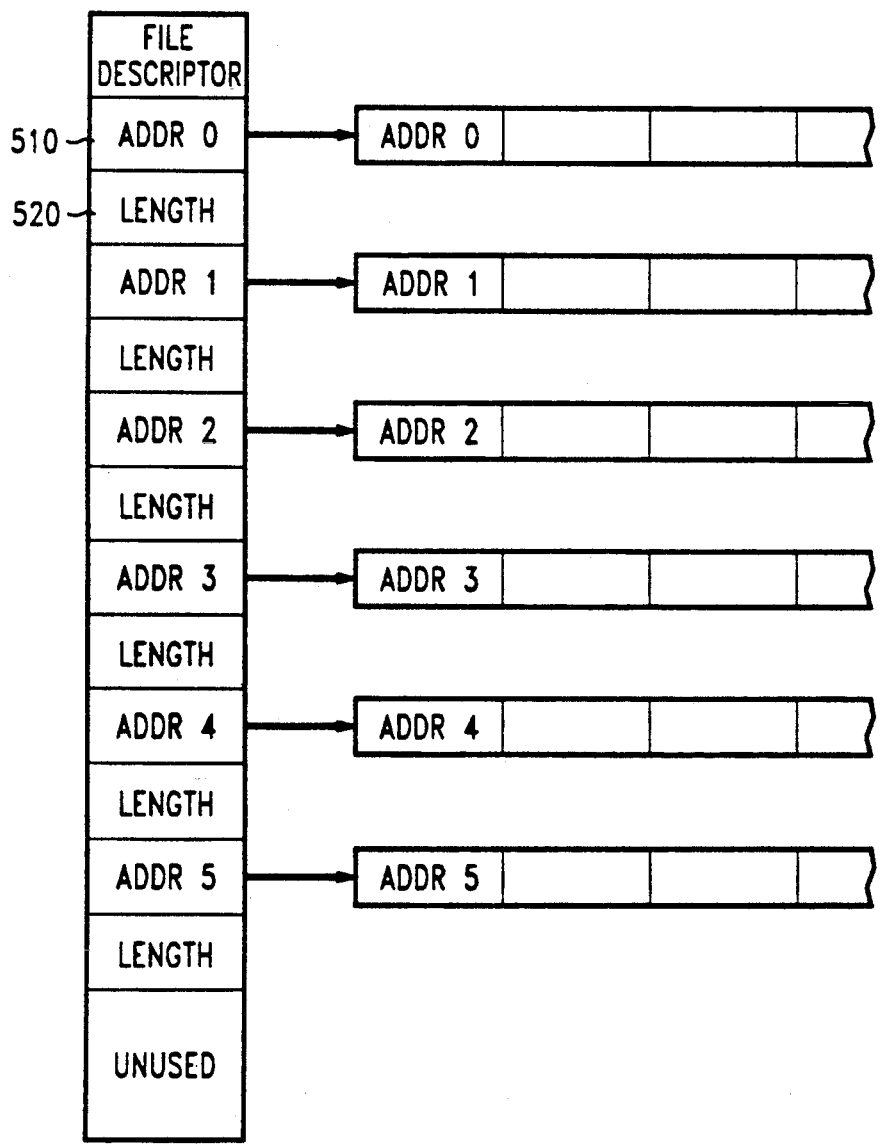

In FIG. 5, a file descriptor of a mixed random and contiguous data blocks is shown. This type of file descriptor lists the address of the first data block 510 and a length or number of contiguous data blocks 520 for up to five different locations on the disk.

Figure 6:
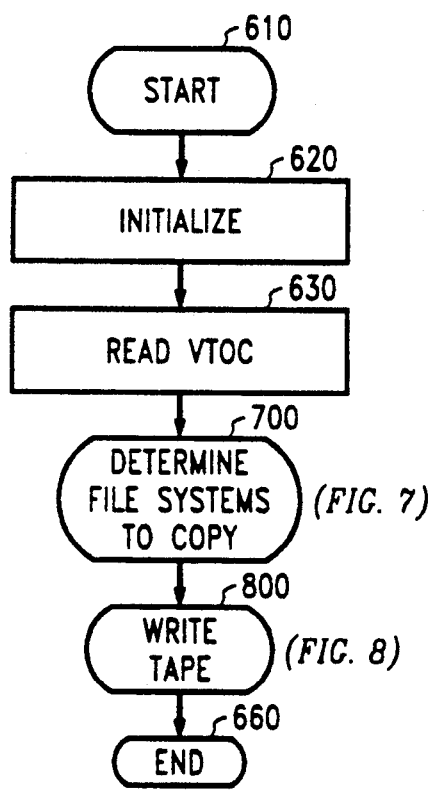
FIGS. 6–15 are flow charts describing the exemplary computer data backup method performed in the system of FIG. 1.

Turning now to FIG. 6, a flowchart of the exemplary embodiment of this invention is shown. Generally, the exemplary embodiment first initializes data structures and variables used in processing. Next, the specific file systems to be copied are developed into an ordered list. The ordered list of file systems is sequentially traversed and the copy operations are performed on each file system. The copy operations comprise allocating and clearing a bit map and then traversing the file system's file organizational structure, setting a bit in the bit map corresponding to data blocks allocated to files. After the file system's organizational structure has been traversed and the bit map made, the copy operation sequentially scans the bit map for set bits. The copy operation records the disk addresses of the first and last data blocks of a first range of allocated data blocks corresponding to contiguous set bits in the bit map. The copy operation next records the addresses of the first and last data blocks of a second range of allocated data blocks corresponding to contiguous set bits in the bit map. The number of contiguous unset bits corresponding to unallocated data blocks between the first and second ranges is calculated. If the calculated number of unset bits is less than a predetermined number corresponding to the size of the media overhead, then the unset bits are treated as if they were set, and the two ranges are combined including all unallocated data blocks. The media overhead is a predetermined constant, for example for a tape 12 blocks, determined by the data density of the tape, inter-record gap size and the distance needed for the tape to be accelerated to read/write speed. The ranges are then copied to tape.

Processing begins at circle 610, labeled "start". Processing continues to action block 620, where variables and data structures used in this process are initialized. In this process, CP memory 112 (FIG. 1) is allocated and cleared, as is known in the art.

After initialization 620, processing continues to action block 630, wherein the volume table of contents (VTOC) of the disk being copied to tape is read. The VTOC contains information about the file systems on the disk, as discussed above in connection with FIG. 2, including the disk address of the first data block and the disk address of the last data block, and whether the partition is a generic or a database. Processing proceeds to action block 700 where control transfers to the subroutine of FIG. 7, to determine the file systems to copy. This subroutine will be discussed further in connection with FIG. 7. Processing continues in FIG. 6 to action block 800 where control transfers to the subroutine of FIG. 8 to write the tape. In this subroutine, the file systems to be copied, as determined by the previous subroutine, are read, and a bit map is generated of the blocks that contain data. The bit map is then read, and the data containing blocks are written to tape. This function will be discussed further in connection with FIG. 8. Processing ends in circle 660.

Figure 7:
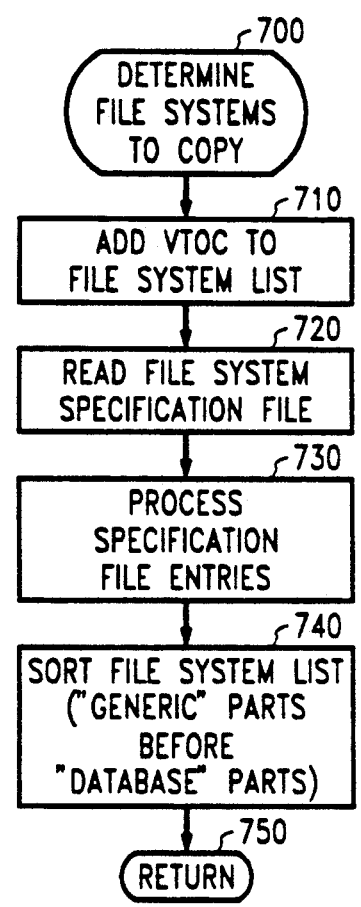

Turning now to with FIG. 7, a flow chart of the subroutine 700 is shown. Generally, this subroutine makes a list of the file systems on the disk to be copied to tape, and orders the list so that generic file systems are copied first, and then database file systems are copied. Processing starts in action block 710 where the VTOC block is added to the list of file systems to be copied. The VTOC block is always copied to the tape because it is used to determine target media compatibility when the data is restored from tape.

In the preferred embodiment of this invention, file systems on a disk may be selectively copied to tape, or all of the file systems on the disk may be copied. To this end, a specification file as is known in the art containing an alpha numeric string representing the file name of the file system to be copied is copied into a local data structure in action block 720 and read. Processing proceeds to action block 730 where the specification file entries are processed. In block 730 information regarding the file systems, including the starting and ending addresses, is retrieved from the VTOC and stored in the local data structure. A determination is made of each file system whether it is a generic or a database. In action block 740, the file system list is sorted to copy the generic partitions to tape first, and then the database. Processing continues to circle 750, where the program returns to block 700 of FIG. 6.

Figure 8:
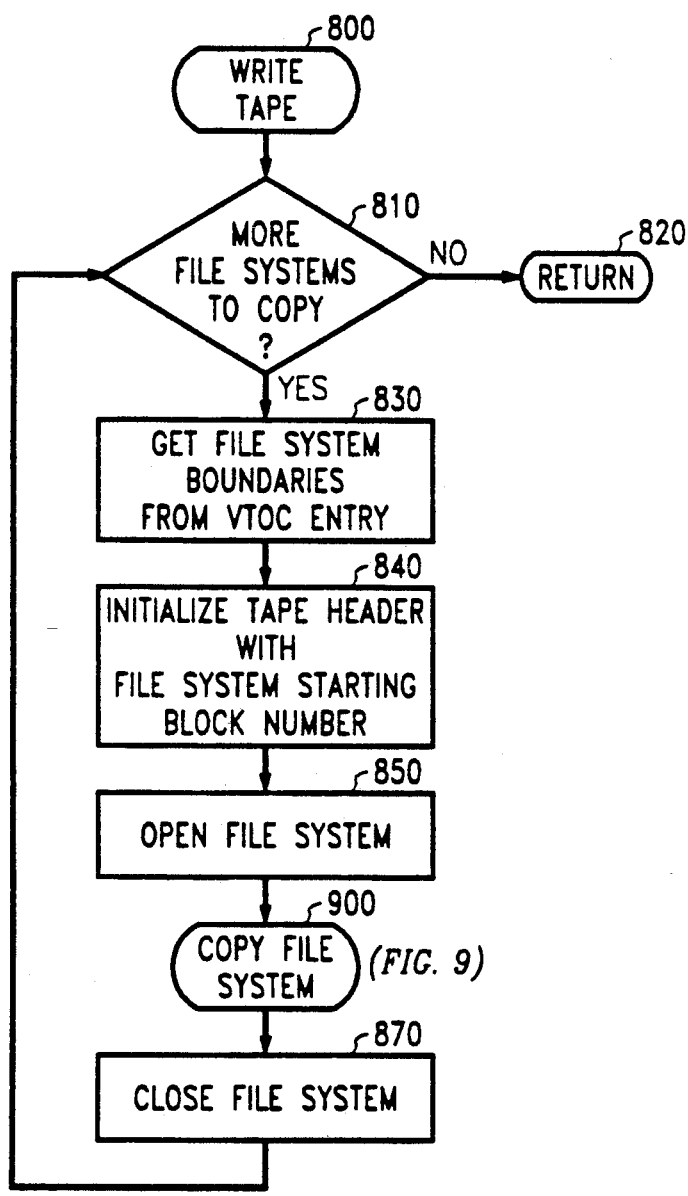

Turning now to FIG. 8 the write tape subroutine is shown starting at circle 800. The write tape subroutine sequentially traverses the previously generated list of file systems to be copied, opens the file system, calls a subroutine to copy the file system to tape, and closes the file system. Basically, this subroutine is a loop.

Processing proceeds to decision diamond 810 where a test is made whether there are more file systems to copy to tape. If there are no more file systems to copy, processing proceeds to circle 820 where the program returns.

If there are more file systems to copy in decision diamond 810, processing proceeds to action block 830 where the address of the first block and last block of the file system is read from the VTOC entry. Processing proceeds to action block 840 where a tape header for blocks for this file system is initialized. The tape header includes the physical disk address at which the first data block resides. The address is used to restore the data to its proper location on disk when the tape is read. Processing continues to action block 850, where the file system on the disk is opened for reading, in order to gain access to the file system.

Processing proceeds to circle 900 where control transfers to the copy file system subroutine. After the copy file system subroutine 900 returns, processing proceeds to block 870 where the file system is closed and the function loops back to decision diamond 810 where it is determined whether there are any more file systems to copy.

Figure 9:
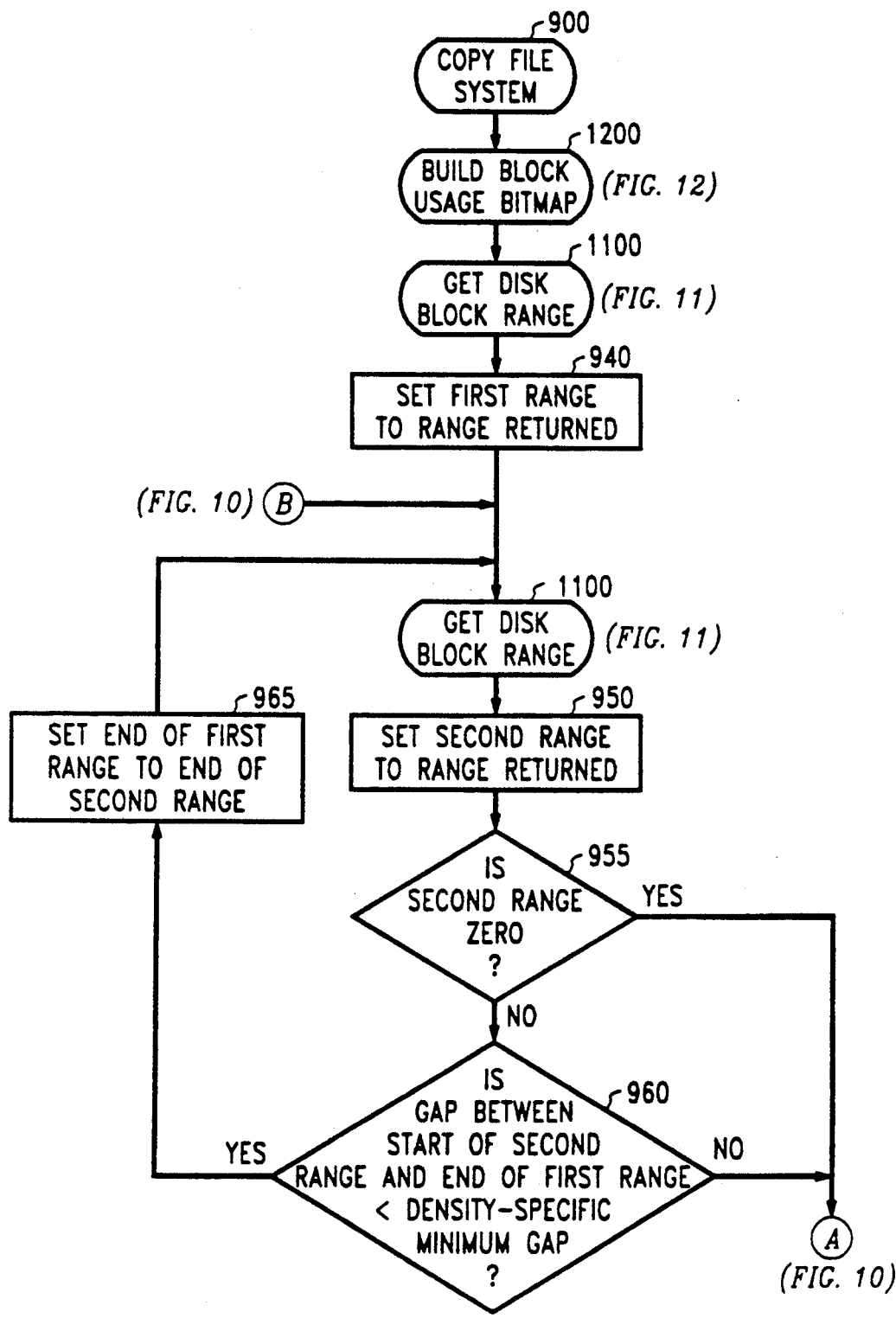

Turning now to FIG. 9, the copy file system subroutine 900 is shown. The copy file system subroutine first builds a block usage bit map for the file system being copied. Next, a first range of contiguous, allocated data blocks is determined from the bit map, then a second range of contiguous, allocated data blocks is determined from the bit map. If the number of unallocated data blocks between the first range and the second range is less than a predetermined number, then the first and second ranges are merged as the first range, and a new second range is determined. This loop continues until either the end of the file system is encountered, or the number of unallocated data blocks is greater than or equal to the predetermined number. The first range of data blocks is then copied to tape.

Processing starts in this subroutine at circle 900. Processing proceeds to circle 1200 where control transfers to the build block usage bit map subroutine 1200. The build block usage bit map subroutine 1200, as will be described below in connection with FIG. 12, builds a bit map of the data storage blocks containing data in this file system. When the build usage bit map subroutine 1200 returns, control transfers to the get disk block range subroutine 1100. The get disk block range subroutine 1100, as will be described below in connection with FIG. 11, determines the next contiguous group of data blocks by scanning the bit map.

When the get disk block range subroutine 1100 returns, processing continues to action block 940 where a first range variable is set to the range of disk blocks determined by subroutine 1100. Processing transfers a second time to the get disk block range subroutine 1100 where the next range of contiguous data blocks is determined. When subroutine 1100 returns, a second range variable is set to the next range of data blocks returned from subroutine 1100 in action block 950.

Processing continues to decision diamond 955. In decision diamond 955, the process branches if the second range is zero. If second range is zero, then the end of the file system has been encountered, and processing continues through connector A, as described below, in connection with FIG. 10. If the second range is not zero, processing continues to decision diamond 960. In decision diamond 960, the process branches if the number of empty data blocks would take less tape than the media overhead would. If the number of empty data blocks would take less tape than the media overhead would, then processing continues through connector A. If the number of empty data blocks would take less tape than the media overhead, for example, the minimum inter-record gap in decision diamond 960, processing continues to action block 965 where the end of the first range is set to the end of the second range. This action concatenates the first and second ranges, including the empty data blocks between them. Processing then loops around to the get disk block range subroutine 1100 to obtain a new second range. Also entering this loop is connector B, from FIG. 10.

Figure 10:
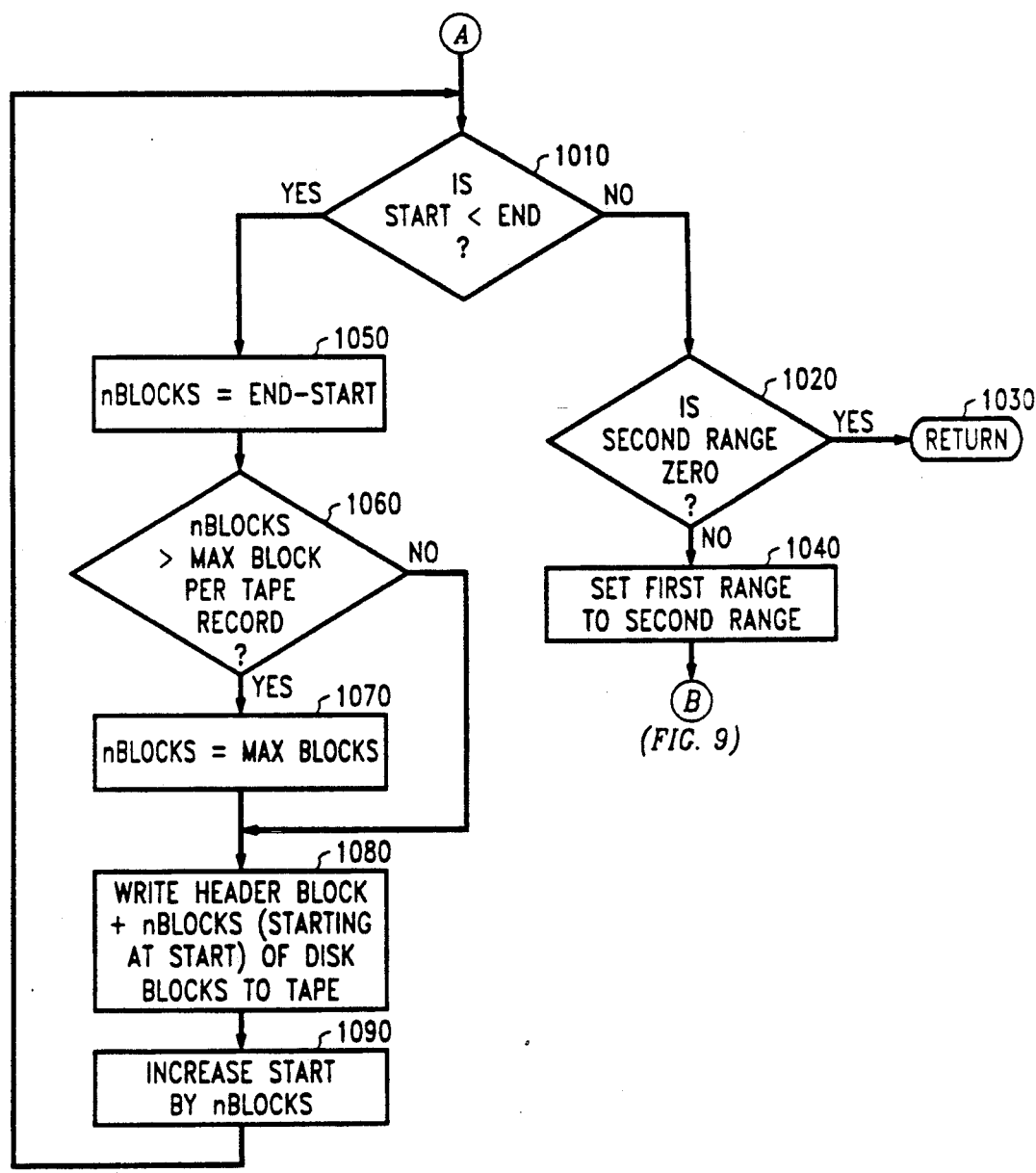

Turning now to FIG. 10, processing starting at connector A is shown. Processing proceeds to decision diamond 1010. In decision diamond 1010, processing branches if the address of the first data block of the first range is less than the address of the last data block of the first range. If the address of the first data block is greater than or equal to the address of the last data block, then the entire first range has been copied to tape. Processing then proceeds to decision diamond 1020. In decision diamond 1020, processing branches if the second range is zero. If the second range is zero, all of the data blocks in this file system have been copied, and processing proceeds to circle 1030 where this subroutine returns. If the second range is not zero, then there is another contiguous group of data blocks to be copied in this file system, and the first range is set to the second range in action block 1040. Processing proceeds through junctor B to FIG. 9.

If the address of the first block is less than the address of the last block in decision diamond 1010, then there are more data blocks in the first range to copy to tape. A temporary variable labeled "nblocks" is set equal to the number of blocks in the first range in action block 1050. Processing continues to decision diamond 1060 where "nblocks" is checked against the maximum number of blocks that may be copied per tape record. If "nblocks" is greater than the maximum number of blocks that may be copied per tape record, then the first range cannot be copied as a whole. Processing continues to action block 1070 where the variable "nblocks" is set equal to the maximum number of blocks per tape record, and processing proceeds to action block 1080.

If in decision diamond 1060, "nblocks" was not greater than the maximum number of blocks that may be copied per tape record, then the first range contiguous group may be copied as a whole. Processing branches to action block 1080 where the header block and the number of blocks starting at the beginning of the first range is copied to tape as known in the art. Processing continues to action block 1090 where the address of the first data block of the first range is increased by the number of blocks copied to tape and processing loops to decision diamond 1010.

Figure 11:
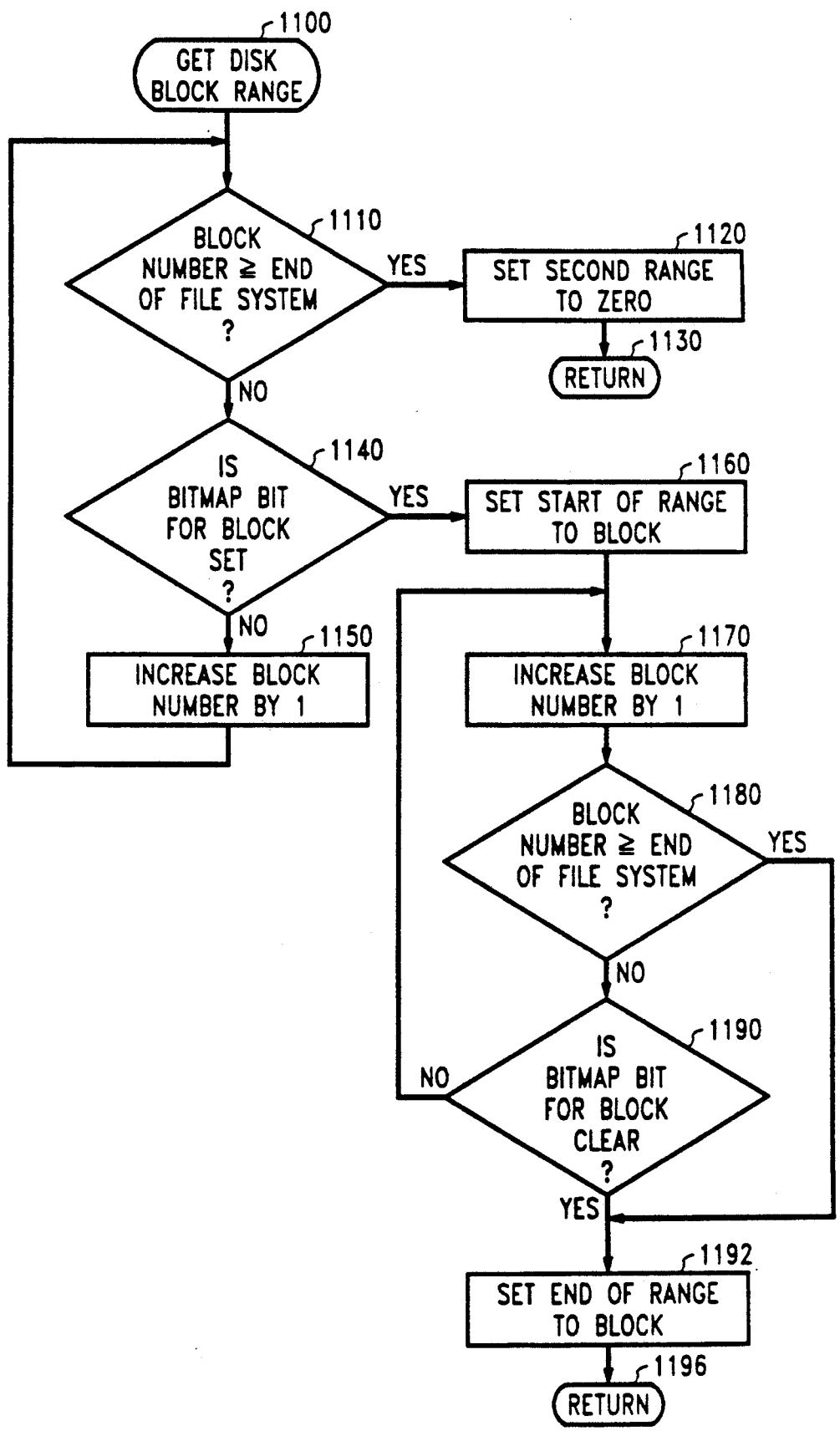

Turning now to FIG. 11, the get disk block range subroutine 1100 is shown. Processing enters at circle 1100 and proceeds to decision diamond 1110 where the address of the current block is compared to the address of the last block of the file system as determined by reading the superblock. If the address of the current block is greater than or equal to the address of the end of the file system, then processing branches to action block 1120 where the range is set to "zero", and processing branches to circle 1130 where this subroutine returns.

If the address of the current data block is less than the address of the end of the file system, then processing proceeds to decision diamond 1140. If the bit map bit corresponding to the address of the current data block is not set in decision diamond 1140, then processing proceeds to action block 1150 where the current block is increased by one. At this point empty blocks between ranges are being skipped.

If the bit map bit for the current block is set in decision diamond 1140, then processing branches to action block 1160, where the starting address of the second range is set to the address of the current data block. Processing proceeds to action block 1170 where the address of the current data block is incremented by one.

Processing proceeds to decision diamond 1180 where the address of the current data block is again compared to the address of the end of the file system. If the address of the current data block is not greater than or equal to the end of the file system, a test is made in decision diamond 1190 whether the bit map bit for the current data block is not set. If the bit map bit is determined to be set in decision diamond 1190, then processing loops back to action block 1170. If the bit map bit is not set in decision diamond 1190, or if the address of the current data block is greater than or equal to the end of the file system in decision diamond 1180, then the end of the second range has been reached and the end of the second range is set to the address of the current data block in action block 1192 and the subroutine returns in circle 1196.

Figure 12:
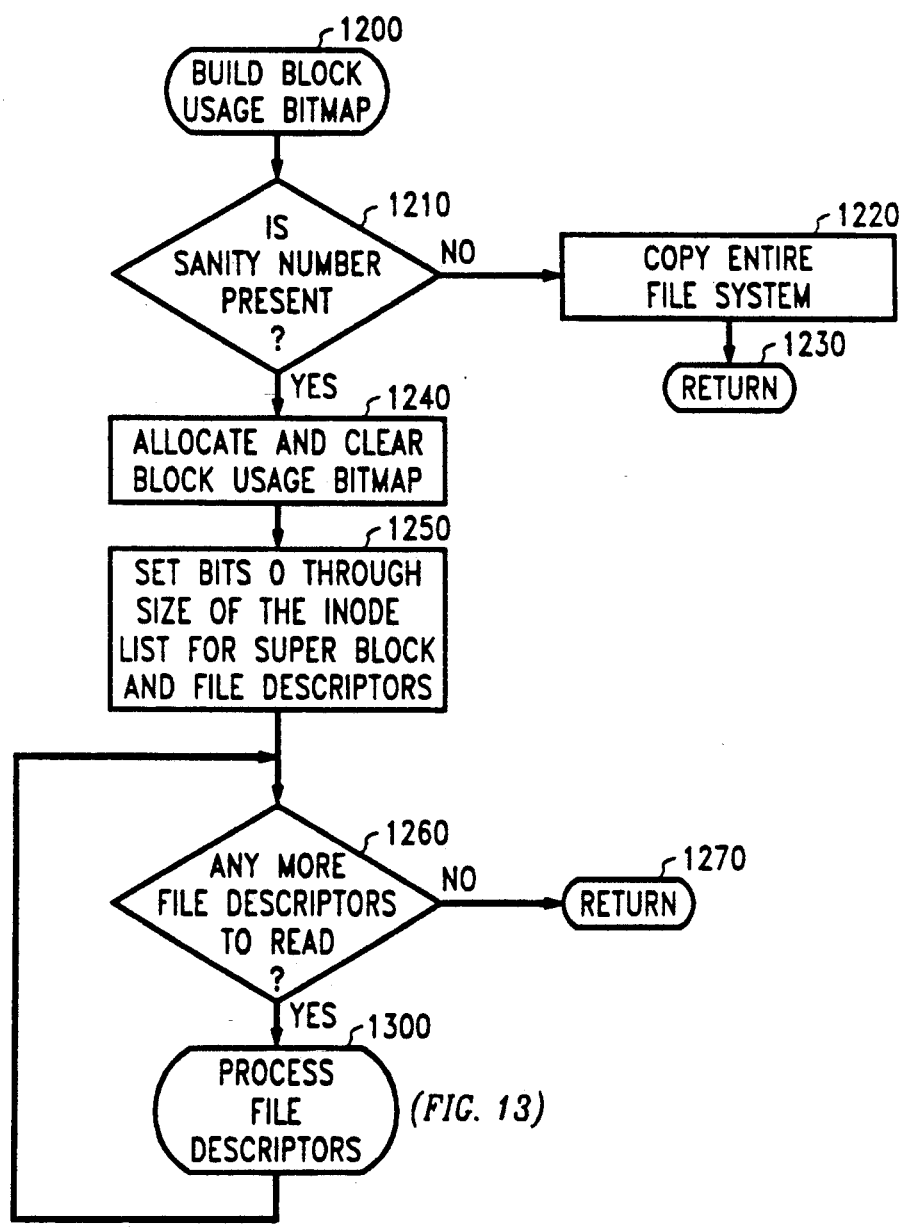

Turning now to FIG. 12, a flow chart of the build block usage bit map subroutine 1200 is shown. Processing proceeds to decision diamond 1210 where a sanity check is made on the super block of the file system. This test may include checking for a constant value in the super block data structure, or any other sanity check as is know in the art. If the super block does not pass the sanity check, then processing branches to action block 1220 where it is determined that the entire file system will be copied to tape and processing continues to circle 1230 where this subroutine returns.

If the super block passes the sanity check in decision diamond 1210 then processing branches to action block 1240. In action block 1240 memory 113 (FIG. 1) is allocated and cleared for the data block bit map. Processing continues to action block 1250 where the first several bits are set in the bit map, representing the super block and the file descriptor table, which are always copied.

Processing continues to a loop in which the file descriptor table is processed. In this embodiment of this invention, the file descriptors contain a list of all data-containing data blocks. Therefore, the file descriptor list is sequentially read, and a bit set in the bit map for each data block allocated to an file descriptor.

Processing proceeds to decision diamond 1260. In decision diamond 1260, the file descriptor table is checked to determine if there are any more file descriptors to read. If all of the file descriptors have been read, then processing branches to action block 1270 where this subroutine returns.

If it is determined there are more file descriptors to read in decision diamond 1260, then processing proceeds to the process file descriptor subroutine 1300. When the process file descriptor subroutine returns, processing loops to decision diamond 1260 to determine if there are any more file descriptors to read.

Figure 13:
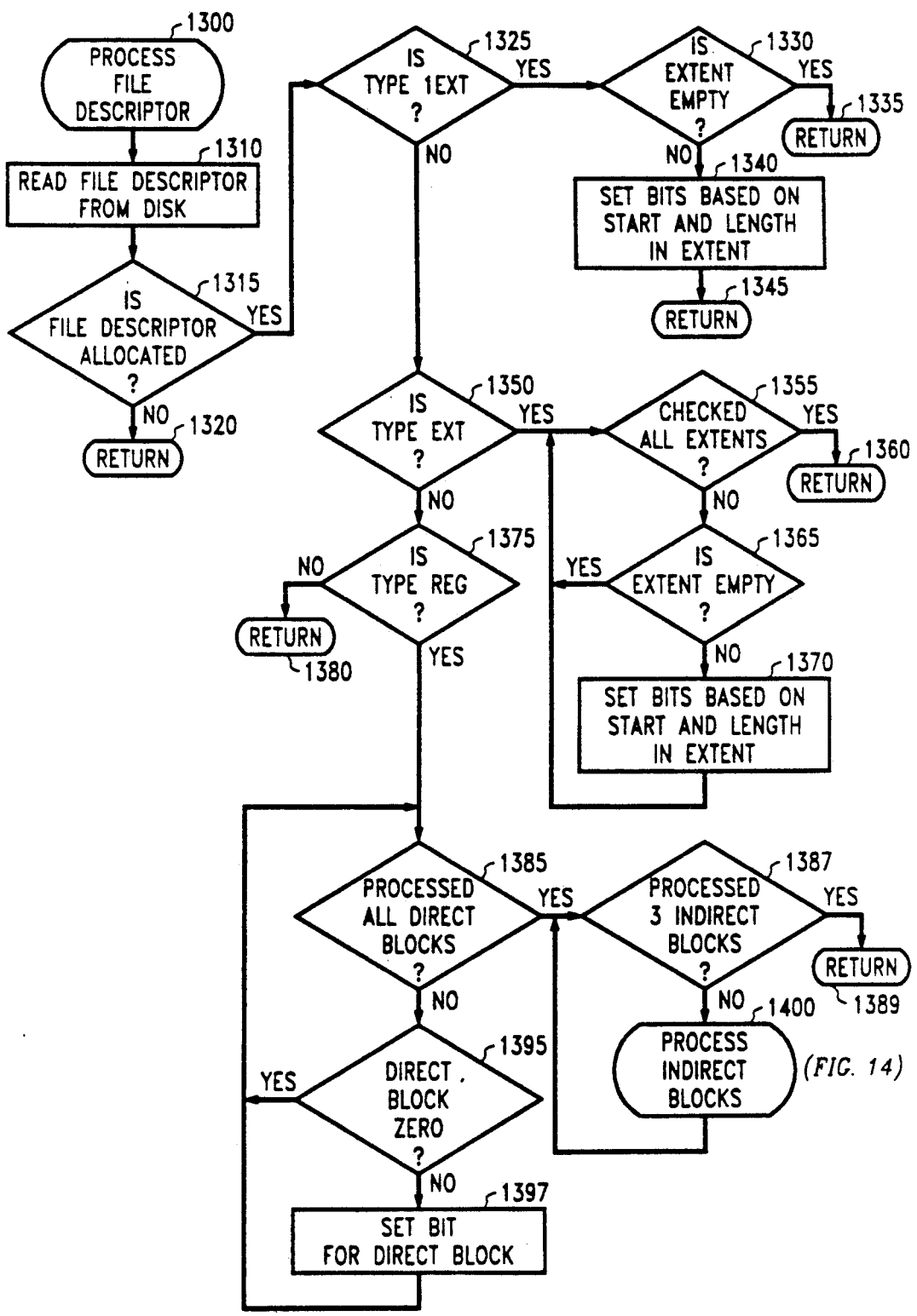

Turning now to FIG. 13, the process file descriptor subroutine 1300 is shown. In this subroutine, all data blocks allocated to an file descriptor are marked on the bit map. Processing enters at the process file descriptor circle 1300 and continues to action block 1310 where the file descriptor is read from disk so that the file descriptor may be processed. Processing continues to decision diamond 1315. In decision diamond 1315, the file descriptor is checked to determine whether the file descriptor is allocated to a file. If the file descriptor is not allocated to a file, then it contains no data blocks, and processing branches to circle 1320 and returns.

If the file descriptor is allocated in decision diamond 1315, then the type of file descriptor is checked. Processing continues to decision diamond 1325, where the type is checked if it is of type "1 extent". If it is a type "1 extent", a check is made in decision diamond 1330, to determine if the extent is empty. If the extent is empty in decision diamond 1330, then there are no data blocks allocated to this file descriptor, and the subroutine returns in circle 1335. If the extent is not empty in decision diamond 1330, then there are data blocks assigned to this file descriptor, and the data blocks are contiguous. All of the bits are set in the bit map, based on the start and length of the extent of data blocks. Processing continues from action block 1340 to the return circle 1345.

If the type is not "1 extent" in decision diamond 1325 processing proceeds to decision diamond 1350 where the type is checked for "extent". If the type is type "extent" in decision diamond 1350, then processing continues to a loop controlled by decision diamond 1350. This loop processes all "extents" in the file descriptor. A test is made in decision diamond 1355 to determine if all "extents" have been checked. If all "extents" have been checked in decision diamond 1355, then processing branches to the return circle 1360. If all of the extents have not been checked in decision diamond 1355, then the current extent is checked to determine if the current extent is empty in decision diamond 1365. If the extent is not empty, then all bits in the bit map based on the address of the start data block and length of the extent are set in action block 1370, and processing loops from action block 1370 to decision diamond 1355.

If in decision diamond 1350 the type is not "extent", processing continues to decision diamond 1375 where the type "regular" is checked. If the type is not regular then the file descriptor has no associated data blocks and processing branches to the return circle 1380.

If the type is "regular" then processing continues to decision diamond 1385. In decision diamond 1385 a test is made to determine if all of the direct blocks of the file descriptor have been checked. A file descriptor in this embodiment may contain up to ten direct data block addresses. If all of the direct data blocks have not been checked in decision diamond 1385, then a check is made to determine if the next direct data block address is zero in decision diamond 1395. If the next direct block is empty in decision diamond 1395, then processing loops back to decision diamond 1385. If the direct block is not empty, then the bit in the bit map corresponding to the address of the data block is set in action block 1397. Processing then loops back to decision diamond 1385.

If in decision diamond 1385 all direct blocks have been checked, then processing proceeds to process the three indirect blocks. Processing continues to decision diamond 1387 where a check is made to determine if all three direct blocks have been processed. If not, processing proceeds to a subroutine 1400, where the indirect blocks are processed. Subroutine 1400 returns and processing loops to decision diamond 1387. Once all three indirect blocks have been processed, processing proceeds to the return circle 1389.

Figure 14:
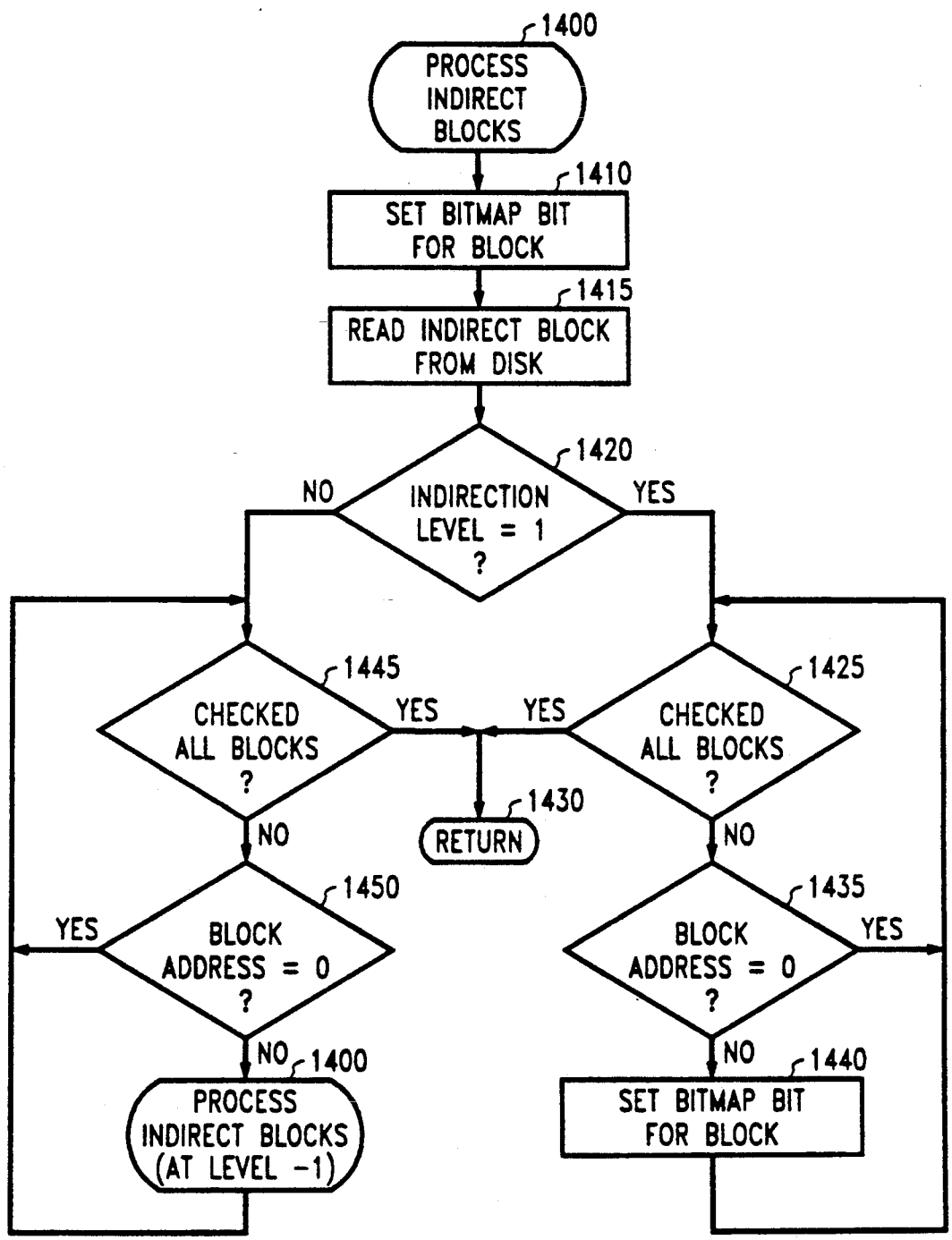

Turning now to FIG. 14, the processing of the indirect blocks subroutine 1400 is shown. The process indirect block subroutine 1400 performs a depth-first search of three layers of indirection possible in the file system according to this embodiment of this invention. Each indirect block is read from disk and a bit is set in the bit map corresponding to the address of the indirect block. Then the indirect block is sequentially examined, and a bit is set in the bit map corresponding to the address of each data block in the indirect block. This subroutine calls itself recursively until all three levels of indirect blocks have been examined.

Processing enters through circle 1400 and proceeds to action block 1410 where the bit map bit corresponding to the address of the indirect block is set. Processing continues to action block 1415, where the indirect block is read from the disk. Processing continues to decision diamond 1420, where a check is made to determine if the indirection level is one. If the indirection level is one, all of the indirect data blocks have been checked except for the first level. Processing proceeds to a loop controlled by decision diamond 1425, where the direct addresses of the data blocks listed in the indirect block are sequentially processed. In decision diamond 1425, a check is made to determine if all of the data blocks in the first indirect level have been checked. If they have, then processing branches to return circle 1430. If all of the data blocks have not been checked in decision diamond 1425, then processing proceeds to decision diamond 1435 where a test is made to determine if the address of the current data block is zero. If the address is zero, processing loops to decision diamond 1425. If the address is not zero, then in action block 1440 a bit in the bit map corresponding to the address of the data block is set and processing loops to decision diamond 1425.

If in decision diamond 1420 the indirection level was not one, then processing proceeds to a loop controlled by decision diamond 1445. This loop sequentially processes indirect blocks that contain a list of addresses of other indirect blocks. The indirect block address list is sequentially processed, and, for each non-zero disk address, the process indirect block subroutine is called.

In decision diamond 1445, a test is made to determine if all indirect blocks in the list have been checked. If all of the indirect blocks have been checked in decision diamond 1445, then processing proceeds to the return circle 1430. If all of the data blocks have not been checked, then a test is made to determine if address of the current data block is equal to zero in decision diamond 1450. If the address of the data block is equal to zero in decision diamond 1450 then processing loops to decision diamond 1445. If the address of the indirect block is not equal to zero in decision diamond 1450, then processing proceeds to subroutine call 1400, where the indirect block subroutine 1400 is recursively called. When subroutine 1400 returns, processing loops to decision diamond 1445.

Figure 15:
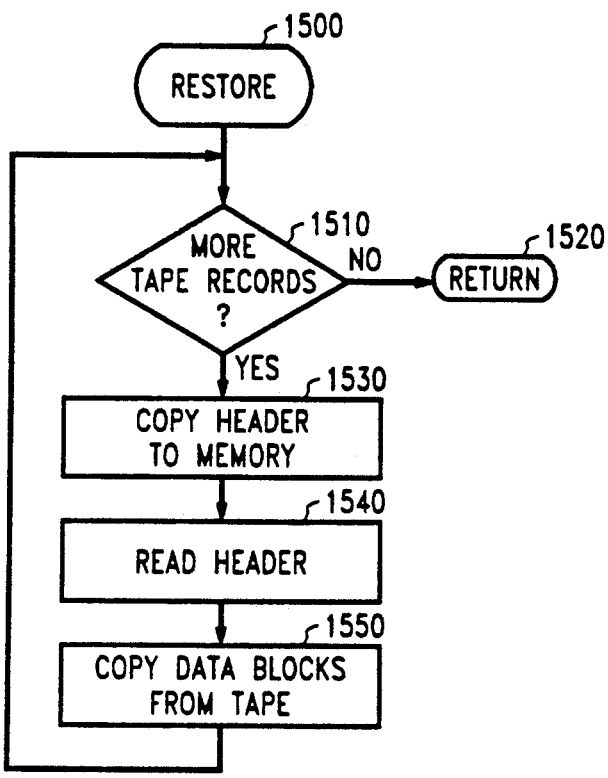

Turning now to FIG. 15, the procedure for restoring the disk from the tape is shown. This procedure generally takes a tape as it was copied from the disk, and restores the disk blocks to their proper locations. To this end, a decision is made in decision diamond 1510 whether there are further tape records to copy from tape to the disk. If there are no further tape records to copy to the disk in decision diamond 1510, then the program returns in circle 1520.

If there are further tape records to copy as determined in decision diamond 1510, processing proceeds to action block 1530, where the header block is copied into memory. Processing proceeds to action block 1540 where the header block is examined for the starting address and the length of the tape record. Processing proceeds to action block 1550. In action block 1550 data blocks which were copied to the tape are copied from the tape to the disk in contiguous ranges, starting at the address read from the header block in action block 1530. Processing then loops to decision diamond 1510.

ALTERNATIVE EMBODIMENT

Figure 16:
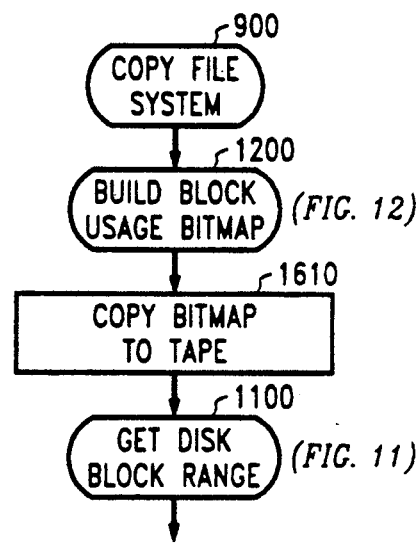
FIGS. 16–17 are flow charts describing an alternative method of the invention.

Turning now to FIG. 16, an alternative embodiment of a method according to this invention is shown. FIG. 16 shows a modified portion of FIG. 9. Processing proceeds as above through the generation of the bit map 1200, FIG. 12. After the block usage bit map is built 1200, processing proceeds to action block 1610, where a copy of the block usage bit map is written as the first record on the tape. As a result, a header block need not be generated for each data record on tape and tape records may contain non-contiguous blocks. Also, the second range is not required.

Figure 17:
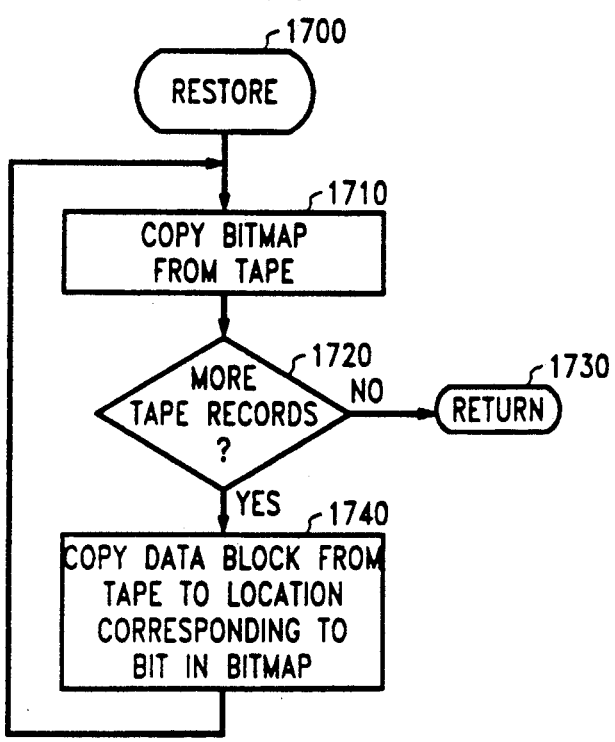

When the disk is being restored from the tape, FIG. 17, processing enters through circle 1700. As a first step, the bit map is read into memory, in action block 1710. A decision is made in decision diamond 1720 whether there are further tape records to copy. If there are no further tape records to copy to the disk in decision diamond 1720, then the program returns in circle 1730.

If there are further tape records to copy as determined in decision diamond 1710, processing proceeds to action block 1740. In action block 1740, data blocks are copied from tape into locations on the disk that correspond to the bit location in the bit map. Processing loops to decision diamond 1740. The tape is then read, and the blocks are copied from the tape to locations on the disk corresponding to the addresses of bits that were set in the bit map.

It is to be understood that the above-described embodiments are merely illustrative of the principles of the invention, and that many variations may be devised by those skilled in the art without departing from the spirit and scope of the invention. For example, after it has been determined that the number of empty data blocks is less than the predefined number, the bits representing the empty data blocks can also be set in the bit map, and the first range to be copied to disk determined accordingly. It is, therefore, intended that such variation be included within the scope of the claims.

What is claimed is:

1. A method of copying information stored on a first medium to a second medium, said information being stored on said first medium as a plurality of blocks, said method comprising the steps of:
   determining ones of said plurality of blocks stored on said first medium that contain data,
   generating a data structure which records an indication of each of said determined ones of said plurality of blocks, reading said data structure to determine a first range of contiguous blocks as recorded in said data structure and copying to said second medium said first range of said plurality of blocks as recorded in said read data structure.

2. A method according to claim 1 further comprising
after said step of determining said first range, generating a header block including a unique address for a first block in said first range, and
copying said header block to said second medium before said step of copying to said second medium said first range of contiguous blocks.

3. A method according to claim 2 further comprising the steps of
copying information stored on said second medium to a first medium, including the substeps of:
reading said header block,
copying said first range from said second medium to said first medium, so that said first range is located on said first medium starting at said unique address included in said read header block.

4. A method according to claim 1 further comprising
after said step of determining said first range, determining a second range of contiguous blocks recorded in said data structure,
determining a number of empty blocks between said first range and said second range, said empty blocks not containing data,
before said step of copying to said second medium said first range of contiguous blocks, comparing said determined number to a predefined number, and in response to said determined number being less than said predefined number, concatenating said first range, said empty blocks and said second range as said first range.

5. A method of copying information stored on a first medium to a second medium, said information being stored on said first medium as a plurality of blocks, said method comprising
determining ones of said plurality of blocks stored on said first medium that contain data,
generating a bit map recording an indication of each of said determined ones of said plurality of blocks, said indications comprising a given binary value in positions of said bit map corresponding to the location of said determined ones of said plurality of blocks stored on said first medium, and
reading said generated bit map and copying to said second medium ones of said plurality of blocks from locations on said first medium corresponding to positions of said read bit map having said given binary value.

6. A method according to claim 5 further comprising
after reading said bit map, determining a first range of contiguous blocks recorded in said bit map having said given binary value and copying to said second medium said first range.

7. A method according to claim 6 further comprising
after determining said first range, determining a second range of contiguous blocks recorded in said bit map as having said given binary value,
determining a number of empty blocks between said first range and said second range,
comparing said determined number to a predetermined number, and in response to said determined number being less than said predetermined number, concatenating said first range, said empty blocks and said second range as said first range.

8. A method according to claim 5 further comprising
after generating said bit map, storing a copy of said bit map on said second medium,
after copying ones of said plurality of blocks to said second medium, copying said stored bit map from said second medium to said first medium,
reading said stored bit map,
copying said copied blocks from said second medium to said first medium at locations on said first medium corresponding to positions of said stored bit map having said given binary value.

9. A method of copying information stored on a computer disk to a magnetic tape, said information being stored on said computer disk as a plurality of blocks, said method comprising
a. determining ones of said plurality of blocks stored on said computer disk that contain data,
b. generating a bit map which records an indication of each of said determined ones of said plurality of blocks, said indications comprising a given binary value in each position of said bit map corresponding to the locations of said determined ones of said plurality of blocks on said computer disk,
c. determining a first range of contiguous blocks having said given binary value in the corresponding contiguous positions of said bit map.
d. determining a second range of contiguous blocks having said given binary value in the corresponding contiguous positions of said bit map,
e. determining a number of blocks between said first range and said second range,
f. comparing said determined number to a predefined number,
g. when the determined number is less than said predefined number, concatenating said first range, said blocks having said other binary value and said second range, as said first range and repeating steps d, e and f,
h. when the determined number is not less than said predefined number, copying said first range to said magnetic tape, and
i. repeating steps c through h.

10. A method according to claim 9 wherein step i comprises repeating steps c through h until all blocks having said given binary value in said bit map have been copied to said magnetic tape.

11. A method of copying information stored on a computer disk to a magnetic tape, said information being stored on said computer disk as a plurality of blocks, said method comprising
a. determining ones of said plurality of blocks stored on said computer disk that contain data,
b. generating a bit map which records an indication of each of said determined ones of said plurality of blocks, said indications comprising a given binary value in positions of said bit map corresponding to the locations of said determined ones of said plurality of blocks on said computer disk,
c. storing said bit map on said magnetic tape,
d. determining a range of contiguous blocks having said given binary value in the corresponding contiguous positions of said bit map,
e. copying said determined first range of contiguous blocks to said magnetic tape,
f. repeating steps d and e,
reading said bit map stored on said magnetic tape, and copying said determined ones of said plurality of blocks that contain data from said magnetic tape to said computer disk at locations corresponding to positions of said read bit map having said given binary value.

12. A method of copying information stored on a first medium to a second medium, said information being stored on said first medium as a plurality of files, said files being organized into one or more file systems, each of said one or more file systems including a list of file descriptors associating one of said files with one of said one or more file systems, each of said file descriptors including a list of data blocks associated with said file, said data blocks storing information on said first medium, said method including the steps of:
   determining ones of said one or more file systems to copy to a second medium;
   for each determined file system, generating a bit map by sequentially reading the file descriptor list for said each determined file system, and
   for each file descriptor, setting a bit in said bit map, wherein said bit's position in said bit map corresponds to the address of each data block listed in the file descriptor,
   reading the bit map for each determined file system and copying to said second medium data blocks as indicated by said bits in said bit map.

13. A method according to claim 12 wherein said step of reading said bit map further comprises
   determining a first range of contiguous blocks indicated by said bits in said bit map, and
   copying to said second medium said first range of contiguous blocks.

14. A method according to claim 13 further comprising
   after said step of determining said first range, generating a header block including a unique address for a first block in said first range, and
   copying said header block to said second storage medium before copying said first range.

15. A method according to claim 14 further comprising the steps of
   copying information stored on said second medium to a first medium, including the substeps of:
   reading said header block,
   copying said first range from said second medium to said first medium, so that said first range is located on said first medium starting at said unique address included in said read header block.

16. A method according to claim 13 further comprising
   after the steps of determining said first range, determining a second range of contiguous blocks indicated by said bits in said bit map,
   calculating the number of empty blocks between said first range and said second range, said empty blocks not containing data,
   comparing said calculated number to a predetermined number and in response to said determined number being less than said predetermined number, concatenating said first range, said empty blocks and said second range as said first range.

17. A method according to claim 12 further comprising the steps of
   after the step of generating said bit map, copying said bit map to said second medium,
   reading said stored bit map,
   copying said data blocks from said second medium to said first medium at locations corresponding to positions of said read bit map having said given binary value.

18. A method of copying information stored on a computer disk to a magnetic tape, said information being stored on said computer disk as a plurality of files, said files being organized into one or more file systems, each of said one or more file systems including a list of file descriptors associating one of said files with one of said one or more file systems, each of said file descriptors including a list of data blocks storing information on said computer disk associated with said file, said method comprising the steps of:
   a. determining ones of said one or more file systems to copy to said tape,
   b. for each determined file system, generating a bit map by sequentially reading the file descriptor list associated with said determined file system and setting a bit in said bit map to a given binary value in positions of said bit map corresponding to said data blocks listed in each of said file descriptors,
   c. determining a first range of contiguous blocks having said given binary value by reading said bit map,
   d. determining a second range of contiguous blocks having said given binary value by reading said bit map,
   e. determining a number of blocks having a binary value other than said given binary value between said first range and said second range,
   f. comparing said determined number to a predetermined number,
   g. when the determined number is less than said predetermined number, concatenating said first range, said blocks having said other binary value and said second range as said first range and repeating steps d, e and f,
   h. when the determined number is not less than said predefined number, copying said first range to said magnetic tape, and
   i. repeating steps c through h for each determined file system.

19. A method of copying information stored on a computer disk to a magnetic tape, said information being stored on said computer disk as a plurality of files, said files being organized into one or more file systems, each of said one or more file systems including a list of file descriptors associating one of said files with one of said one or more file systems, each of said file descriptors including a list of data blocks storing information on said computer disk associated with said file, said method comprising the steps of:
   a. determining ones of said one or more file systems to copy to said tape,
   b. for each determined file system, generating a bit map by sequentially reading the file descriptor list associated with said determined file system and setting a bit in said bit map having a given binary value in positions of said bit map corresponding to said data blocks listed in each of said file descriptors,
   c. storing said bit map on said tape,
   d. determining a range of contiguous blocks having said given binary value by reading said bit map,
   e. copying said range to said magnetic tape, and
   f. repeating steps d and e for each determined file system,
   g. reading said stored bit map, and
   h. copying said ranges from said magnetic tape to said computer disk at locations corresponding to positions of said read bit map having said given binary value.

* * * * *